United States Patent
Ganapathiappan et al.

(10) Patent No.: US 7,608,646 B1
(45) Date of Patent: Oct. 27, 2009

(54) POLYMER-ENCAPSULATED PIGMENT WITH BRIDGING LAYER

(75) Inventors: Sivapackia Ganapathiappan, Palo Alto, CA (US); Kent D. Vincent, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 435 days.

(21) Appl. No.: 11/414,099

(22) Filed: Apr. 28, 2006

(51) Int. Cl.
*C09D 11/10* (2006.01)

(52) U.S. Cl. ............... 523/160; 523/210; 428/407; 524/556

(58) Field of Classification Search .............. 523/160
See application file for complete search history.

(56) References Cited

U.S. PATENT DOCUMENTS

| | | | |
|---|---|---|---|
| 5,554,739 A | 9/1996 | Belmont | |
| 5,922,118 A | 7/1999 | Johnson et al. | |
| 5,990,202 A | 11/1999 | Nguyen et al. | |
| 6,057,384 A | 5/2000 | Nguyen et al. | |
| 6,063,182 A * | 5/2000 | Babler | 106/506 |
| 6,248,805 B1 | 6/2001 | Nguyen et al. | |
| 6,417,249 B1 | 7/2002 | Nguyen et al. | |
| 6,616,946 B1 * | 9/2003 | Meier et al. | 424/489 |
| 6,716,949 B2 | 4/2004 | Ganapathiappan et al. | |
| 6,767,090 B2 | 7/2004 | Yatake et al. | |
| 6,841,591 B2 | 1/2005 | Vincent et al. | |
| 6,858,301 B2 | 2/2005 | Ganapathiappan | |
| 6,997,978 B2 | 2/2006 | Kabalnov et al. | |
| 7,030,175 B2 | 4/2006 | Vincent et al. | |
| 2002/0180854 A1 * | 12/2002 | Sato et al. | 347/96 |
| 2003/0029355 A1 | 2/2003 | Miyabayashi et al. | |
| 2003/0050362 A1 | 3/2003 | Sakai et al. | |
| 2003/0050364 A1 * | 3/2003 | Sato et al. | 523/160 |
| 2003/0195274 A1 | 10/2003 | Nakamura et al. | |
| 2003/0225185 A1 | 12/2003 | Akers, Jr. et al. | |
| 2004/0063808 A1 | 4/2004 | Ma et al. | |
| 2004/0127639 A1 | 7/2004 | Wang et al. | |
| 2004/0157956 A1 * | 8/2004 | Vincent et al. | 523/160 |
| 2004/0157957 A1 | 8/2004 | Ganapathiappan et al. | |
| 2004/0157958 A1 * | 8/2004 | Vincent et al. | 523/160 |
| 2005/0131102 A1 * | 6/2005 | Nakazawa et al. | 523/160 |
| 2005/0222296 A1 * | 10/2005 | Nakazawa et al. | 523/200 |

OTHER PUBLICATIONS

Adsorption Properties of Poly(N-vinylpyrrolidone-co-methacrylic acid) Hydrogels, Solpan et al. Journal of Macromolecular Science, Part A: Pure and Applied Chemistry, 43:129-152, 2006.*

* cited by examiner

*Primary Examiner*—David Wu
*Assistant Examiner*—Vu Nguyen

(57) ABSTRACT

The present invention is drawn to pigment suspensions, methods of forming pigment suspensions, and ink sets. The pigment suspension can comprise an aqueous liquid vehicle and a polymer-encapsulated pigment suspended in the liquid vehicle. The polymer-encapsulated pigment can include a pigment core, a bridging layer deposited on a surface of the pigment core, and a polymer encapsulation layer attached to or deposited on the bridging layer.

22 Claims, No Drawings

POLYMER-ENCAPSULATED PIGMENT WITH BRIDGING LAYER

FIELD OF THE INVENTION

The present invention relates generally to polymer-encapsulated pigments. More particularly, the present invention is drawn to encapsulated pigment particulates having a bridging layer between the particulate and a polymer encapsulation layer.

BACKGROUND OF THE INVENTION

There are several reasons that ink-jet printing has become a popular way of recording images on various media surfaces, particularly paper and photo media substrates. Some of these reasons include low printer noise, capability of high-speed recording, and capability of multi-color recording. Additionally, these advantages can be obtained at a relatively low price to consumers. With respect to ink-jet ink chemistry, the majority of commercial ink-jet inks are water-based. Thus, their constituents are generally water-soluble, as in the case with many dyes, or water dispersible, as in the case with pigments. Furthermore, ink-jet inks have low viscosity to accommodate high frequency jetting and firing chamber refill processes common to ink-jet architecture.

With specific reference to pigment-based ink-jet inks, latex-containing ink-jet inks, and/or polymer-encapsulated pigments, there are special difficulties associated with maintaining appropriate dispersion stability, especially when the ink is to be jetted from a thermal ink-jet architecture. For example, polymer encapsulated pigments of various kinds are known, e.g., SUNSPERSE and FLEXIVERSE polymer coated pigments from Sun Chemical Corporation are representative. While certain encapsulation methods and chemistries are known, many polymer-encapsulated pigments are not very compatible with thermal ink-jet architecture. For example, these polymer surfaces can tend to cause pigments to either agglomerate under the high thermal shear conditions of the architecture firing chamber, causing nozzle and ink channel blockages, or have excessive glass transition temperatures that prevent room temperature print film formation. Thus, incorporation of such polymer encapsulated pigments within thermal inkjet inks either results in pen reliability reduction or poor print durability colorant performance, respectively. As a result, it would be desirable to provide methods, polymer-encapsulated pigments, inks, ink sets, and systems that provide improved polymer-encapsulated pigment colorants, which can be more readily adapted for use in thermal ink-jet architecture, among other applications.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle" refers to the fluid in which polymer-encapsulated pigments of the present invention are dispersed to form a pigment suspension. Often, the fluid of the pigment suspension can be used as an ink-jet ink, or becomes incorporated with other solvents, surfactants, etc., to form an ink-jet ink. Many liquid vehicles and vehicle components are known in the art. Typical liquid vehicles can include a mixture of a variety of different agents, such as surfactants, co-solvents, buffers, biocides, sequestering agents, viscosity modifiers, and water.

The term "colorant" can include dyes and/or pigments.

The term "pigment" generally includes pigment colorants, magnetic particles, aluminas, silicas, and/or other ceramics or organo-metallics, whether or not such particulates impart color. Thus, though the present description primarily exemplifies the encapsulation of pigment colorants, the term "pigment" can be used more generally to describe not only pigment colorants, but other pigments such as organometallics, ferrites, ceramics, etc. Sometimes, to provide information about the spatial relationship between the pigment and the encapsulating layers, the term "pigment core" is used, which refers to the component that is being encapsulated, and which is at the base of the three-layered polymer-encapsulated pigment.

"Bridging component" is a material that is solubility sensitive to temperature, pH, dilution or concentration, or some other environmental change in the medium that contains the bridging component. For example, a bridging component has a first solubility in a solvent(s) at a first temperature or pH, and a second solubility in that solvent(s) when the temperature or pH is changed, usually relatively minimally, e.g., changing a pH from 5.5 or less to 6.0 or greater or vice versa, or changing a temperature from room temperature to above 32° C. or vice versa. Typically, the bridging component is a polymer. The bridging component is used in accordance with embodiments of the present invention to form a bridging layer on a pigment particulate.

"Bridging layer" is a bridging component after it has been deposited on the surface of a pigment particulate. It is typically a soluble material that is desolublized and deposited on the pigment surface by a change in the environmental conditions, e.g., temperature, pH, etc., of the fluid of the pigment dispersion in which it is carried.

"Polymer encapsulation layer" is a layer of polymer or latex material that is deposited on or attached to a bridging layer, e.g., adsorption or covalent attachment, which is deposited on the surface of the pigment. Once the polymer encapsulation layer is formed, the change of the environmental conditions that brought about the formation of the bridging layer is typically of little consequence, and the polymer encapsulation layer acts to protect the bridging layer from becoming substantially resolubilized.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "0.1 wt % to 5 wt %" should be interpreted to include not only the explicitly recited concentration of 0.1 wt % to 5 wt %, but also include individual concentrations and the sub-ranges within the indicated range. Thus, included in this numerical range are individual concentrations, such as 1 wt %, 2 wt %, 3 wt %, and 4 wt %, and sub-ranges, such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than 5 wt %" should be interpreted to include all values and sub-ranges between 0 wt % and 5 wt %. Furthermore, such an interpretation should apply regardless of the breadth of the range or the characteristics being described.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

With these definitions in mind, a pigment suspension in accordance with embodiments of the present invention can comprise an aqueous liquid vehicle and a polymer-encapsulated pigment suspended in the liquid vehicle. The polymer-encapsulated pigment can include a pigment core, a bridging layer deposited on a surface of the pigment core, and a polymer encapsulation layer attached or deposited on the bridging layer.

In another embodiment, a method of making a polymer-encapsulated pigment can comprise dispersing a pigment in a liquid and dissolving a bridging component in the liquid to form a solubilized bridging component. Additional steps can include changing a property of the liquid to thereby cause at least a portion of the solubilized bridging component to become a desolubilized bridging component deposited on a surface of the pigment and attaching or depositing a polymer to the desolubilized bridging component. These steps can be performed sequentially in any functional order including performing simultaneous steps.

In another embodiment, an ink set can comprise a first ink-jet ink and a second ink-jet ink (and optionally, third, fourth, fifth, sixth, etc., ink-jet inks). The first ink-jet ink can comprise a first aqueous liquid vehicle and a first polymer-encapsulated pigment colorant suspended in the first liquid vehicle. The first polymer-encapsulated pigment colorant can include a first pigment core, a first bridging layer deposited on a surface of the pigment core, and a first polymer encapsulation layer attached or deposited on the first bridging layer. The second ink-jet ink can comprise a second aqueous liquid vehicle and a second polymer-encapsulated pigment colorant suspended in the second liquid vehicle. The second polymer-encapsulated pigment colorant can include a second pigment core, a second bridging layer deposited on a surface of the second pigment core, and a second polymer encapsulation layer attached or deposited on the bridging layer. In this embodiment, the first pigment core and the second pigment core can be different pigment colorants, the first bridging layer and the second bridging layer can be formed of the same material, and the first polymer encapsulation layer and the second polymer encapsulation layer can be formed of the same material. The first and second liquid vehicle can be the same or different.

The formation of pigment suspensions in accordance with the above embodiments provides several advantages. For example, polymer-encapsulation of pigments tends to reduce the number of total particles in solution (as opposed to having separate latex particulates co-dispersed with the pigments) and their combined surface areas such that the pigment suspension, e.g., ink, viscosity can be reduced. Such polymer-encapsulation also provides a particle dispersion where the particle surfaces are more uniformly charged, and are therefore more stable. Encapsulation also prevents pigment-latex separation when applied to a substrate, e.g., ink printed on a media substrate, such that durability and optical density are more optimized. Polymer-encapsulated pigments also facilitate the result that each pigment particle becomes trapped below the surface of latex formed films (after printing) such that gloss and color-to-color gloss uniformity is enhanced. Additionally, when preparing an ink set, by applying a bridging group to the surface of each of the different pigments in the ink set, common polymer encapsulation layers can be applied to the surface of each of the different types of pigments without difficulty, which provides significant advantages in print quality, thermal ink-jet reliability, etc.

Without the bridging layer applied to a pigment surface as described above, in-situ monomer polymerization around individual pigments is made difficult because most pigments contain free radical quenching surface groups such as amines and phenols. Such quenching disrupts polymer formation and adsorption on the pigment surface, and thus, can result in residual unreacted monomer in the finished product. In the present invention, pigment particles can be "passivated" by adsorption of a bridging layer on the surface of the pigment particle or pigment core. The bridging layer can be applied using a bridging component, e.g., bridging polymer or other bridging material, that has two water solubility states, e.g., more water soluble vs. less water soluble. Such different states may be induced thermally, by pH change, by concentration change or dilution, or other mechanism. In its water soluble state, the bridging component can be part of an aqueous solution which includes at least some of the bridging component in a dissolved form, and further includes homogenously dispersed pigment particles. The bridging component can be converted to a bridging layer, e.g., passivation layer, by converting the bridging component (which can be a dissolved polymer) into its water insoluble state. Thus, the polymer wants to come out of solution and becomes adsorbed onto the hydrophobic surface of the pigment. Once formed, the adsorbed polymer or bridging layer provides a surface that is suitable for latex or other polymers to be attached thereto. As mentioned, in one embodiment, the bridging layer passivates the pigment surface and creates a seed layer for monomer encapsulation, such as by an emulsion polymerization monomer feed process. This bridging layer can also create a suitable surface for subsequent polymer attachment.

Regarding the formation of the bridging layer per se, in one embodiment, the bridging component polymer can be a polyalkylacrylamide or combination of polyalkylacrylamides. In particular, polyisopropylacrylamide is water soluble at room temperature and water insoluble at temperatures above 32° C. In this instance, pigment passivation is induced by raising the temperature of the dissolved polymer in the pigment dispersion solution to above 32° C. This and other polyalkylacrylamides provide an excellent seed layer for emulsion polymerization of an encapsulating monomer and resultant polymer. Polyisopropylmethacrylamide is another example of a thermally sensitive bridging component that can be used. As a particular benefit, the formation of the bridging layer and subsequent polymer encapsulation layers can be carried out in a single semi-batch process. Additionally, it is noted that because the bridging layer is at least partially or even fully trapped by the hydrophobic latex polymer capsule, there is little consequence associated with its return to a water soluble state when the encapsulated pigment particles are cooled back to room temperature. Other advantages of the bridging layer is that it uniquely enables up to full latex polymer encapsulation of individual pigment particles of sufficient capsule thickness and capsule uniformity to provide both excellent thermal ink-jet printability and durable print film formation. It should be noted, however, that though these polymer-encapsulated pigments are particularly useful in thermal ink-jet architecture, the present invention is generally applicable to a wide variety of pigments and applications, including but not limited to paints, coatings, and other inks (including piezo ink-jet and other types of general printing inks).

In further, detail, the bridging component can be any material, e.g., polymer, having an opposed bi-stable water solubility state. Such polymers should be selected for process compatibility with emulsion polymerization process. While several mechanisms for opposed bi-stable water solubility states are available, including thermal, pH, and component concentration changes, thermal induced solubility state change is often less complicated to implement, though both are functional and can be used for the same purpose. This is in part because one skilled in the art will recognize that conventional emulsion polymerization processes involve temperature elevation to invoke polymerization. The reaction bath of the emulsion polymerization process is naturally raised from room temperature, and therefore provides the necessary conditions for thermally induced solubility state change without compromise.

Though a few thermally sensitive polymers have been listed as being useful as bridging components in accordance with embodiments of the present invention, certain pH sensitive bridging components that can be used include poly((2-methacryloyloxy)ethyl phosphorylcholine-block-2-(diisopropylamino)ethyl methacrylate); poly((2-methacrylyoyloxy)ethyl phosphorylcholine-co-2-(diisopropylamino)ethyl acrylate); poly((2-acrylyoyloxy)ethyl phosphorylcholine-co-2-(diisopropylamino)ethyl acrylate); poly((2-acrylyoyloxy)ethyl phosphorylcholine-co-2-(diisopropylamino)ethyl methacrylate); and combinations thereof. These polymers are soluble in water at pH levels less than 5.5 and transform to particles around pH 6.

Other examples of other sensitive polymers that can be used include poly(vinylimidazole-co-methacrylic acid); poly(vinylimidazole-co-acrylic acid); poly(methoxypolyethyleneglycol methacrylate of mol. wt. from 200 to 5000-co-methacrylic acid; poly(methoxypolyethyleneglycol of mol. wt. from 200 to 5000 methacrylate-co-acrylic acid); poly((2-diisopropylamino)ethyl methacrylate-co-methacrylic acid); poly((2-diisopropylamino)ethyl methacrylate-co-acrylic acid); poly(vinylpyrrolidone-co-acrylic acid); and poly(vinylpyrrolidone-co-methacrylic acid); and combinations thereof.

It should be noted that, whether the bridging component is a pH sensitive polymer, a thermal sensitive polymer, a polymer sensitive to concentration change, or is a material sensitive to some other environmental change, general properties such as size, pH sensitivity, thermal sensitivity, etc., can be controlled to some degree by the composition or ratio of the various units on the polymer chain. Further, in the above examples, it should be noted that other comonomers can be added to change the size and the pH, thermal, or other sensitivity of the bridging component. Crosslinking agents can also be used to modulate the sensitivity and other properties of the materials.

In addition to the general methods described above, there are several other methods that can be used to form the bridging layer and the polymer encapsulation layer around a pigment particle. In a first embodiment, the encapsulating latex polymer can be formed in-situ around one or more pigment particles using an emulsion polymerization process. In this process, the pigment can be deaggregated and dispersed in water using standard shear processes, such as microfluidization, sonification, or milling, in the presence of surfactant, dispersing polymer or other dispersing moiety. The dispersed pigment particles can then be mixed with the bridging component, e.g., passivation polymer, such that the bridging component is partially or fully dissolved in solution and forms a homogeneous mixture with the pigment. The condition of the mixture is subsequently changed, for example by temperature or pH change or by dilution, such that the bridging component becomes hydrophobic and consequently is drawn to adsorb onto the pigment surface. Careful selection of pigment dispersant, ratios of pigment to bridging component, etc., can minimize the formation of pure bridging component polymer particles, as it is more desirable that the bridging component be formed primarily on the surface of the pigment particle.

Upon formation of the pigment particle with a bridging layer deposited thereon, a water-soluble initiator suitable for emulsion polymerization can then be introduced into the resultant solution bridging layer-deposited pigment particles with continuous stirring. An aqueous emulsion of latex forming monomers can be prepared and drop-wise introduced into the solution to "seed" onto and bridging layer of the pigment particles using emulsion polymerization synthesis. The thickness of the polymer or latex capsule can be any suitable thickness, but is typically greater than 50 nm to allow adequate film formation to occur on a media substrate upon printing. Typically, the selected pigment core can be sized below 150 nm, but is preferably below 100 nm in diameter, and the latex encapsulated particle diameter can be from about 200 to 300 nm, though diameters outside of this range may be appropriate as well for certain applications.

When applying the bridging layer to the surface of the pigment core, in one embodiment, the concentration range for the bridging component can be from 0.1 to 10 parts (preferably from 1 to 5 parts and most preferably from 2 to 3 parts) for every 10 parts of pigment by weight. In some embodiments, these ratios are helpful in striking a balance between generating enough of a bridging layer to be useful for subsequent polymer encapsulation or pigment passivatation, and having too much bridging component in solution such that individual bridging component particles form when the environment is changed. In other words, it is beneficial to have an appropriate amount of bridging component (compared to pigment particles) present such that a desirable amount of the bridging component becomes adsorbed on the pigment particles, and not so much that particles can be formed by collecting in solution to form their own particles.

In still further detail with respect to the various approaches of applying the bridging layer to a pigment particulate, in one embodiment, the bridging component can be selected from the family of polyalkylacrylamides, other thermal sensitive polymers, pH sensitive polymers, concentration sensitive polymers or the like. In the specific case of polyalkylacrylamides, it is believed that the conformation of the adjoining alkyl group changes with temperature to inhibit the natural hydrogen bonding capability of the amide group, thus making the polymer hydrophobic. Polyisopropylacrylamide has been found to be a particularly good bridging component for use, as mentioned above. In this embodiment, at room temperature, the polyisopropylacrylamide is very water soluble at room temperature and becomes very water insoluble at above 32° C. Once desolubilized, it is deposited onto the surface of the pigment core, and forms an excellent seed layer for conventional vinyl monomers, such as acrylates, methacrylates, and styrenes. This being stated, it is realized that the bridging component can be composed of more than one monomer and/or include additional functional monomers without departing from the bi-stable solubility function of this invention. Such other functions may include, for example, photo-stabilizers and brighteners.

In an alternative approach, a polymer or latex encapsulating polymer can be independently fabricated and subsequently bonded to the bridging layer of a pigment particle. This can be done by applying the pH, thermal, or dilution sensitive bridging layer described above to a pigment particle and combining the polymer or latex with the pigment particles under the action of solvents, milling, heat, or any combination of these. In one example, the polymer capsule material, e.g., latex particulates, solvent, and pigment can ball milled with zirconium balls for 24 hours. The solvent softens the latex such that milling adheres the latex to the bridging layer surface. In general, this approach does not lead to fully or uniformly encapsulated pigment, but these pigments can still be functional for use in thermal ink-jet architecture, as well as for other applications. This being stated, when adequately adhered to the bridging layer surface, the latex particle serves the same purpose as the in-situ processed particle described above.

Referring now in more detail to the polymer encapsulation layer per se, in one embodiment, a latex polymer material can be used. The latex of the present invention is preferably prepared through conventional free radical addition of a monomer mixture through emulsion polymerization. Suitable monomers are included in U.S. Pat. No. 6,057,384, which is incorporated herein by reference in its entirety. The latex can be dispersion stabilized through incorporation of a monomer or monomers that promote latex surface charge. Such monomers are represented by acrylic acid, methacrylic acid, vinyl benzoic acid, and methacryloyloxyethylsuccinate. The charge forming monomers typically comprise from 0.5 wt % to 20 wt %, preferably 3 wt % to 10 wt %, of the monomer mix by weight and are typically neutralized after latex polymerization to form salts. Such salts may be formed through the reaction of a monomer carboxylic acid with potassium hydroxide or other similar salting agent. Particle dispersion stability is also influenced by particle density, which influences the ability of particles to settle within ink-jet architecture microchannels. In the present invention, the monomer mixture, pigment, bridging component, and monomer/polymer-pigment ratio can be selected to collectively produce particles having a density of 0.995-1.10 $gcm^{-3}$, preferably from about 1.03-1.05 $gcm^{-3}$. In most instances, the liquid vehicle of aqueous ink jet inks has a density on the order of 1.01-1.02 $gcm^{-3}$, though this is not required.

Steric stabilizers, such as surfactants, are generally also used to control the latex particle size during polymerization and can also be selected to provide additional pigment particle dispersion stability. Such stabilizers are often adhered to the encapsulated particle surface to minimize thermal stripping under thermal architecture firing conditions. This can be accomplished by matching the hydrophobicity of the latex monomer set and surfactant, and/or through incorporation of a reactive surfactant.

Additionally, the surface dielectric constant of the polymer-encapsulated pigments of the present invention can be from 2.0 to 3.0, and can be below 2.8 in one embodiment. This property can be useful to sufficiently anchor surfactants against thermal shear stripping in thermal ink-jet architecture. Stabilization can also be facilitated by the incorporation of 0.5 wt % to 5 wt %, preferably 1 wt % to 2 wt %, of addition of a multimer, preferably a dimer, capable of forming crosslinks between polymer chains in the latex particle. Such a multimer is represented by ethylene glycol dimethacrylate, for example. These narrow ranges of crosslinking have been found beneficial to maintain the integrity of the latex under the high thermal shear conditions of thermal ink jetting while not adversely impacting its room temperature film-forming properties. Such crosslinking is helpful for latexes having glass transition temperatures below 50° C. Room temperature film-forming latexes require glass transition temperatures in the range of 0° C. to 50° C., preferably 10° C. to 40° C. Higher glass transition temperature ranges may be selected when latex coagulation is accomplished at a higher than ambient temperature, for example by heated fuser roller. The latex may optionally contain color stabilizers that associatively protect the pigment colorant against photo, thermal and gaseous degradation.

In an alternate embodiment, a conventional core-shell latex structure may also be used, where the shell layer incorporates a monomer mix defined by the above surface charge monomer, multimer and dielectric constant specifications. The shell layer, in this case, provides thermal shear and dispersion stabilizing properties independent of the properties of the latex core. The core and shell polymers can collectively provide a latex particle having a bulk density and glass transition temperature as defined above for the monolithic latex. Core-shell latexes are prepared in a two step process; where in a first latex particle is synthesized and forms a seed for polymerization of the shell monomers around the seed particle in the second step. These types of core-shell latexes can be attached to the bridging layer adsorbed on the pigment particle. Alternatively, the core structure, if it is pH, thermal, or otherwise environmentally sensitive, can be used as the bridging component, and the shell can be the encapsulating material. Still further, rather than a three-layered pigment structure, a four-layered pigment structure can be prepared that includes the pigment core, the bridging layer, the core (of the core-shell latex) attached to the bridging layer, and the shell (of the core-shell latex) attached to the core.

It is notable that relative surface tension relationships between the pigment core, bridging layer, and the polymer encapsulation layer(s) can be used to form more specific compositions in accordance with embodiments of the present invention, e.g., uniform and fully encapsulating vs. partially encapsulating, etc. For example, when preparing the various layers of the polymer-encapsulated pigments, each successive layer can be formed to have a surface tension higher than the layer it is coating. Further, falling surface tensions over time can be utilized to some advantage when preparing these polymer-encapsulated pigments. In this optional embodiment, by changing the temperature or pH, for example, the bridging polymer undergoes a gradual change in its solubility parameter and surface tension (which are related properties). In this scenario, the surface tension and solubility can start high (high water solubility and surface tension higher than pigment surface) and end low (low water solubility and surface tension lowers). Thus, this gradual transition from high surface tension low surface tension can allow the bridging component to fall out of solution and onto the pigment surface as a bridging layer while the bridging layer polymer surface tension still may be above that of the pigment, e.g., before ultimately dropping below the surface tension of the pigment. Thus, though not required, the bridging layer can be formed while the solubility is dropping and while the surface tension is still greater than the pigment. With time and after deposition, the solubility state and surface tension continues to change for each monomer unit along the bridging layer until the surface tension of the bridging layer drops below that of the pigment. Because of this, the subsequently applied polymer encapsulation layer can be applied to a bridging layer that actually has a lower surface tension than the original pigment, which can have benefits related to providing full encapsulation in some embodiments. In another embodiment, once the bridging layer is applied, it is possible to utilize post reactive processes to chemically lower the surface tension of the bridging layer and achieve a similar result. For example, a bridging layer can be formed that includes multiple monomers, where one of the monomers acts as a receptor site for post reaction purposes. Alternatively or additionally, a long alkyl chain species could be present or added that would lower the surface tension of the bridging layer surface.

With these parameters in place regarding some of the possible bridging layer-containing polymer-encapsulated pigments that can be formed, a discussion of dispersion fluids, e.g., inks, etc., is useful to exemplify how these pigments can be implemented for use in accordance with an embodiment of the present invention. Typically, inks include a pigment dispersed in a liquid vehicle. Typical liquid vehicle formulation that can be used with the latexes described herein can include water, and optionally, one or more co-solvents present in total at from 0 wt % to 30 wt %, depending on the jetting architecture. Further, one or more non-ionic, cationic, and/or anionic surfactant can be present, ranging from 0 wt % to 5.0 wt %. The balance of the formulation can be purified water, or other vehicle components known in the art, such as biocides, viscosity modifiers, materials for pH adjustment, sequestering agents, preservatives, and the like. Typically, the liquid vehicle is predominantly water.

Classes of co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this invention may range from 0 wt % to 5.0 wt %. It is to be noted that the surfactant that is described as being usable in the liquid vehicle is not the same as the surfactant that is described as being adhered to the surface of the latex particulate, though many of the same surfactants can be used for either purpose.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

In accordance with embodiments of the present invention, the polymer-encapsulated pigments of the present invention can be present in a pigment dispersion at from 1 wt % to 30 wt %. If the pigment dispersion is an ink-jet ink, the polymer-encapsulated pigments of the present invention can be present in a ink-jet ink at from 1 wt % to 10 wt %.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of Poly(N-isopropylacrylamide) Bridging Component

N-isopropylacrylamide (12.5 g) is dissolved in toluene (33 ml) to form a solution. Azobis(isobutyronitrile) (0.15 g) and isooctylthioglycolate (0.2 g) are added thereto and the solution is purged with nitrogen and heated to 85° C. for 3 hours. After cooling, the solidified polymer is filtered and washed with hexane. The hexane insoluble part is removed to obtain poly(N-isopropylacrylamide) almost in a quantitative yield.

Example 2

Encapsulation of Carbon Black Pigment

A dispersion of Degussa Printex 25 carbon black pigment (70 g) is prepared in water using sodium dodecylsulfate (7 g) as a surfactant in water (770 ml). This pigment dispersion (60 g) is mixed with poly(N-isopropylacrylamide) (1.5 g) from Example 1 and stirred well to dissolve the acrylamide polymer in water. The solution is subsequently heated to 90° C. under nitrogen atmosphere, which causes the poly(N-isopropylacrylamide) to come out of solution and deposit on the surface of the carbon black pigment. Potassium persulfate initiator (0.15 g) is added followed by an emulsion prepared from styrene/hexyl methacrylate/3-vinylbenzoic acid/ethyleneglycol dimethacrylate in the weight ratio of 20/70/8/2 (3.5 g) in water (8 ml) containing sodium dodecylsulfate (0.1 g) over a period of 10 minutes. The reaction mixture is maintained at 90° C. for another 4 hours and cooled to obtain polymer-encapsulated pigment colorant.

Example 3

Encapsulation of Carbon Black Pigment

Degussa Printex 25 carbon black pigment (150 g) is dispersed in water (1635 g) containing Lutensol AT 150 (15 g). Poly(N-isopropylacrylamide) (1.0 g) from Example 1 and sodium dodecylsulfate (0.25 g) are added to the above Printex 25 dispersion (60 g). The solution is stirred well to dissolve the acrylamide polymer in water. This solution is heated to 90° C. under nitrogen atmosphere, which causes the poly(N-isopropylacrylamide) to come out of solution and deposit on the surface of the carbon black pigment. Then potassium persulfate (0.15 g) is added followed by the emulsion prepared from styrene/hexyl methacrylate/3-vinylbenzoic acid/ethyleneglycol dimethacrylate in the weight ratio of 20/70/8/2 (3.5 g) in water (8 ml) containing sodium dodecylsulfate (0.1 g) over a period of 10 minutes. The reaction mixture is maintained at 90° C. for another 18 hours and cooled to obtain polymer-encapsulated pigment colorant.

Example 4

Encapsulation of Magenta Pigment

The same procedure is followed as described in Examples 2, except that a Fanal Pink D 4830 pigment is used rather than the Degussa Printex 25 carbon black pigment.

Example 5

Preparation of poly((2-methacryloyloxy)ethyl Phosphorylcholine-block-2-(diisopropylamino)ethyl Methacrylate Bridging Component 2-Methacryloyloxy)ethyl phosphorylcholine (50 g) is polymerized with the initiator bromoethylpropionate (3 g) using copper(I) bromide-dipyridyl complex as a catalyst at 60° C. in acetone for 3 hours. Then, the monomer 2-(diisopropylamino)ethyl methacrylate (50 g) is added to further polymerize the product and obtain a block copolymer. The complex is removed by filtration using a neutral alumina column and the polymer is precipitated in hexane. The precipitated polymer is collected and dried in vacuum to obtain the bridging component.

Example 6

Encapsulation of Carbon Black Pigment

The pigment dispersion from Example 3 (60 g) is mixed with the pH sensitive bridging component (1.5 g) from Example 5. The pH of the solution is adjusted to 3 and stirred well to dissolve the bridging component polymer in water. Then the pH of this mixture is increased to 7. This pH change causes the copolymer to come out of the solution and deposit on the pigment surface. Then, the temperature is increased to 70° C. and a 2,2'-azobis(2-methylpropionamidine) dihydrochloride initiator is added. Within the aqueous phase of the pigment dispersion, an emulsion prepared from styrene/hexyl methacrylate/3-vinylbenzoic acid/ethylene glycol dimethacrylate at weight ratios of 20/78/8/2 (3.5 g) in water (8 ml) containing Lutensol AT 150 (0.1 g) over a period of 10 minutes. The reaction mixture is maintained at 70° C. for another 18 hours and cooled to obtain polymer-encapsulated pigment.

Example 7

Encapsulation of Carbon Black Pigment with Polymer Attached

Example 6 is repeated except that the Degussa carbon black pigment is replaced with the same quantity of a polymer attached carbon black pigment available from Cabot with similar results.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A pigment suspension, comprising:
   a) an aqueous liquid vehicle; and
   b) a polymer-encapsulated pigment suspended in the liquid vehicle, said polymer-encapsulated pigment including a pigment core, a bridging layer deposited on a surface of the pigment core, and a polymer encapsulation layer attached to or deposited on the bridging layer;
   wherein the bridging layer is formed from a bridging component that is soluble in solution, and comes out of solution and becomes deposited on the pigment core upon raising the pH or raising the temperature; or
   wherein the bridging layer is formed from a bridging component that is soluble in solution and comes out of solution and becomes deposited on the pigment core upon lowering the pH or lowering the temperature.

2. A pigment suspension as in claim 1, wherein the pigment core is a pigment colorant, and the pigment suspension is an inkjet ink.

3. A pigment suspension as in claim 1, wherein the bridging layer is formed from a bridging component that is water soluble at a temperature from 10° C. to 60° C., and is water insoluble at a temperature from 20° C. to 90° C.

4. A pigment suspension as in claim 1, wherein the bridging layer is formed of one or more polyalkylacrylamide.

5. A pigment suspension as in claim 1, wherein the bridging layer is formed from a bridging component that is water soluble at a pH from 1 to 7, and is water insoluble at a pH from 5 to 10.

6. A pigment suspension as in claim 1, wherein the bridging layer is formed of a member selected from the group consisting of poly((2-methacryloyloxy)ethyl phosphorylcholine-block-2-(diisopropylamino)ethyl methacrylate); poly((2-methacrylyoyloxy)ethyl phosphorylcholine-co-2-(diisopropylamino)ethyl acrylate); poly((2-acrylyoyloxy)ethyl phosphorylcholine-co-2-(diisopropylamino)ethyl acrylate); poly((2-acrylyoyloxy)ethyl phosphorylcholine-co-2-(diisopropylamino)ethyl methacrylate); poly(vinylimidazole-co-methacrylic acid); poly(vinylimidazole-co-acrylic acid); poly(methoxypolyethyleneglycol methacrylate of mol. wt. from 200 to 5000-co-methacrylic acid; poly(methoxypolyethyleneglycol of mol. wt. from 200 to 5000 methacrylate-co-acrylic acid); poly((2-diisopropylamino)ethyl methacrylate-co-methacrylic acid); poly((2-diisopropylamino)ethyl methacrylate-co-acrylic acid); poly(vinylpyrrolidone-co-acrylic acid); and poly(vinylpyrrolidone-co-methacrylic acid);

and combinations thereof.

7. A pigment suspension as in claim 1, wherein the polymer-encapsulated pigment has bulk density from 0.90 g/cm$^3$ to 1.10 g/cm$^3$ and a surface dielectric constant from 2.0 to 3.0 at room temperature, wherein the polymer encapsulation layer comprises randomly assembled copolymers including from 0.5 wt % to 20 wt % of an acidic monomer, and wherein the acidic monomer present at the surface of the polymer-encapsulated pigment is neutralized after polymerization.

8. A pigment suspension as in claim 1, wherein the polymer encapsulation layer is crosslinked by a crosslinking agent present at from 0.5 wt % to 5 wt %.

9. A pigment suspension as in claim 1, wherein the polymer encapsulation layer has a glass transition temperature from 0° C. to 50° C.

10. A pigment suspension as in claim 1, wherein the polymer layer includes copolymerized monomers formed in situ at the bridging layer such that the polymer layer is covalently attached to or deposited on the bridging layer.

11. A pigment suspension as in claim 1, wherein the polymer layer includes copolymerized monomers formed outside of the aqueous vehicle and is subsequently covalently attached to or deposited on the bridging layer.

12. A pigment suspension as in claim 1, wherein the polymer-encapsulated pigment is from 200 nm to 300 nm in diameter.

13. A method of making a polymer-encapsulated pigment, comprising:
 a) dispersing a pigment in a liquid;
 b) dissolving a bridging component in the liquid to form a solubilized bridging component;
 c) changing a property of the liquid to thereby cause at least a portion of the solubilized bridging component to become a desolubilized bridging component deposited on a surface of the pigment in the form of a bridging layer; and
 d) attaching or depositing a polymer to the bridging layer.

14. A method as in claim 13, wherein steps a) to d) are sequential.

15. A method as in claim 13, wherein the property of the liquid that is changed is temperature, the bridging component is thermally sensitive with respect to solubility, and the bridging layer is formed upon raising or lowering the temperature of the liquid.

16. A method as in claim 13, wherein the property of the liquid that is changed is pH, the bridging component is pH sensitive with respect to solubility, and the bridging layer is formed upon raising or lowering the pH of the liquid.

17. A method as in claim 13, wherein the step of attaching or depositing the polymer to the desolubilized bridging component includes polymerizing monomers at the surface of the desolubilized bridging component.

18. A method as in claim 13, wherein the step of attaching or depositing the polymer to the desolubilized bridging component includes forming a polymer followed by attaching or depositing the polymer to the surface of the desolubilized bridging component.

19. A method as in claim 13, wherein the desolubilized bridging component is a passivation layer, which modifies properties at the surface of the pigment colorant, thereby allowing for improved polymer attachment or deposition compared to attachment or deposition without the passivation layer.

20. A method as in claim 13, wherein the bridging layer is applied when its surface tension is greater than that of the pigment, and wherein step of attaching or depositing the polymer to the bridging layer occurs after the surface tension of the bridging layer is brought below or drops below the surface tension of the pigment.

21. An ink set, comprising:
 a) a first ink-jet ink, comprising:
  i) a first aqueous liquid vehicle, and
  ii) a first polymer-encapsulated pigment colorant suspended in the first liquid vehicle, said first polymer-encapsulated pigment colorant including a first pigment core, a first bridging layer deposited on a surface of the pigment core, and a first polymer encapsulation layer attached or deposited on the first bridging layer; and
 b) a second ink-jet ink, comprising:
  i) a second aqueous liquid vehicle, and
  ii) a second polymer-encapsulated pigment colorant suspended in the second liquid vehicle, said second polymer-encapsulated pigment colorant including a second pigment core, a second bridging layer deposited on a surface of the second pigment core, and a second polymer encapsulation layer attached or deposited on the bridging layer,
 wherein the first pigment core and the second pigment core are different pigment colorants, the first bridging layer and the second bridging layer are formed of the same material, and the first polymer encapsulation layer and the second polymer encapsulation layer are formed of the same material, and
 wherein i) the first and second bridging layers are formed from a respective first and second bridging component that are soluble in solution, and come out of solution and become deposited on the first and second pigment cores, respectively, upon raising the pH or raising the temperature; or wherein ii) the first and second bridging layers are formed from a respective first and second bridging component that are soluble in solution, and come out of solution and become deposited on the first and second pigment cores, respectively, upon lowering the pH or lowering the temperature.

22. An ink set as in claim 21, wherein at least each of a cyan, a magenta, and a yellow pigment in the ink set have bridging layers formed of the same material and polymer encapsulation layers formed of the same materials.

* * * * *

UNITED STATES PATENT AND TRADEMARK OFFICE
CERTIFICATE OF CORRECTION

PATENT NO. : 7,608,646 B1 Page 1 of 1
APPLICATION NO. : 11/414099
DATED : October 27, 2009
INVENTOR(S) : Sivapackia Ganapathiappan et al.

It is certified that error appears in the above-identified patent and that said Letters Patent is hereby corrected as shown below:

In column 5, line 31, delete "methacrylyoyloxy)ethyl" and insert -- methacryloyloxy)ethyl --, therefor.

In column 5, line 32, delete "poly((2-acrylyoyloxy)" and insert -- poly((2-acryloyloxy) --, therefor.

In column 5, line 34, delete "poly((2-acrylyoyloxy)ethyl" and insert -- poly((2-acryloyloxy)ethyl --, therefor.

In column 12, line 21, in Claim 1, delete "solution" and insert -- solution, --, therefor.

In column 12, line 26, in Claim 2, delete "inkjet" and insert -- ink-jet --, therefor.

In column 12, line 42, in Claim 6, delete "methacrylyoyloxy)ethyl" and insert -- methacryloyloxy)ethyl --, therefor.

In column 12, line 43, in Claim 6, delete "poly((2-acrylyoyloxy)" and insert -- poly((2-acryloyloxy) --, therefor.

In column 12, line 45, in Claim 6, delete "poly((2-acrylyoyloxy)ethyl" and insert -- poly((2-acryloyloxy)ethyl --, therefor.

Signed and Sealed this

Twenty-seventh Day of April, 2010

David J. Kappos
*Director of the United States Patent and Trademark Office*